United States Patent Office 3,201,907
Patented Aug. 24, 1965

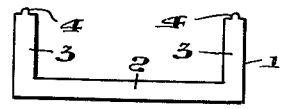
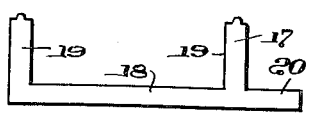
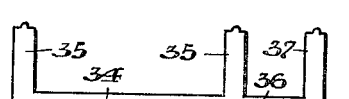
Fig. 1.  Fig. 2.  Fig. 3.
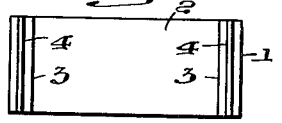
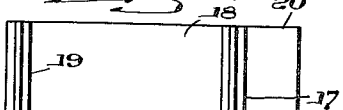
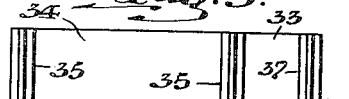
Fig. 4.  Fig. 5.  Fig. 6.
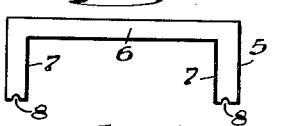
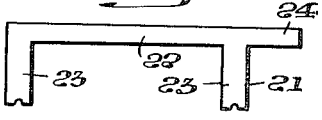
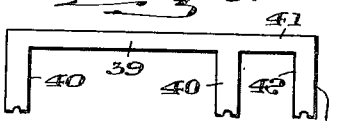
Fig. 7.  Fig. 10.  Fig. 13.
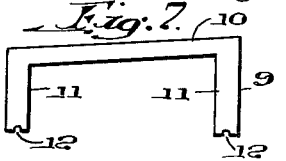
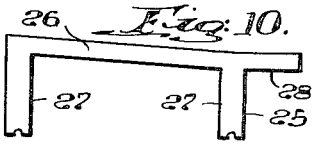
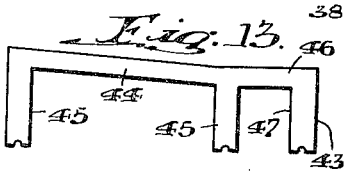
Fig. 8.  Fig. 11.  Fig. 14.
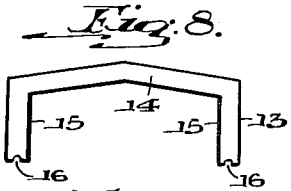
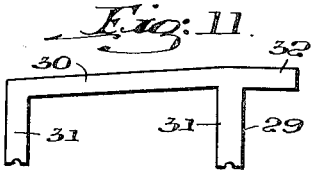
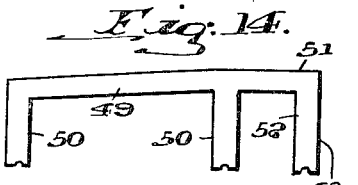
Fig. 9.  Fig. 12.  Fig. 15.
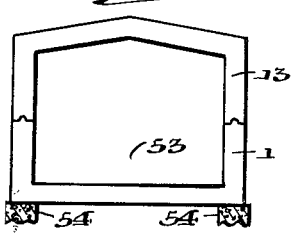
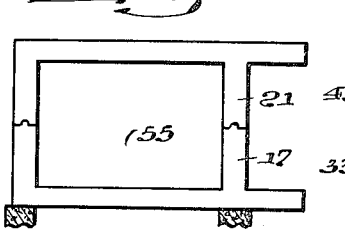
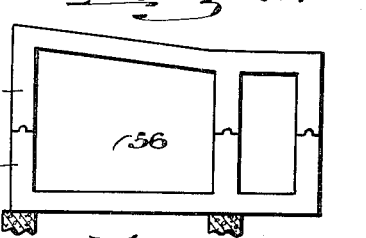
Fig. 16.  Fig. 17.  Fig. 18.
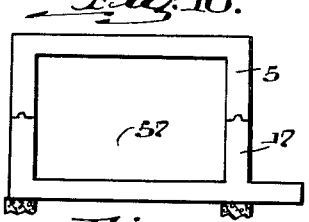
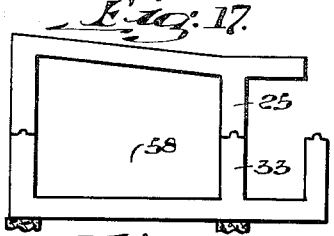
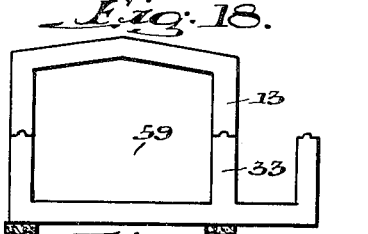
Fig. 19.  Fig. 20.  Fig. 21.
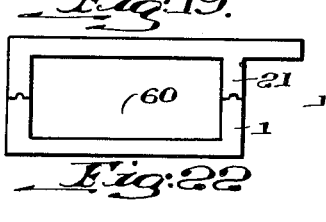
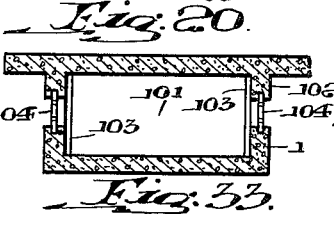
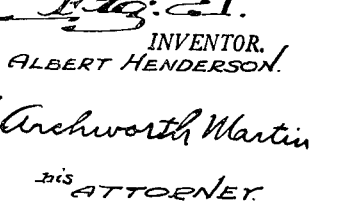
Fig. 22.  Fig. 23.
INVENTOR.
ALBERT HENDERSON
BY Archworth Martin
his ATTORNEY

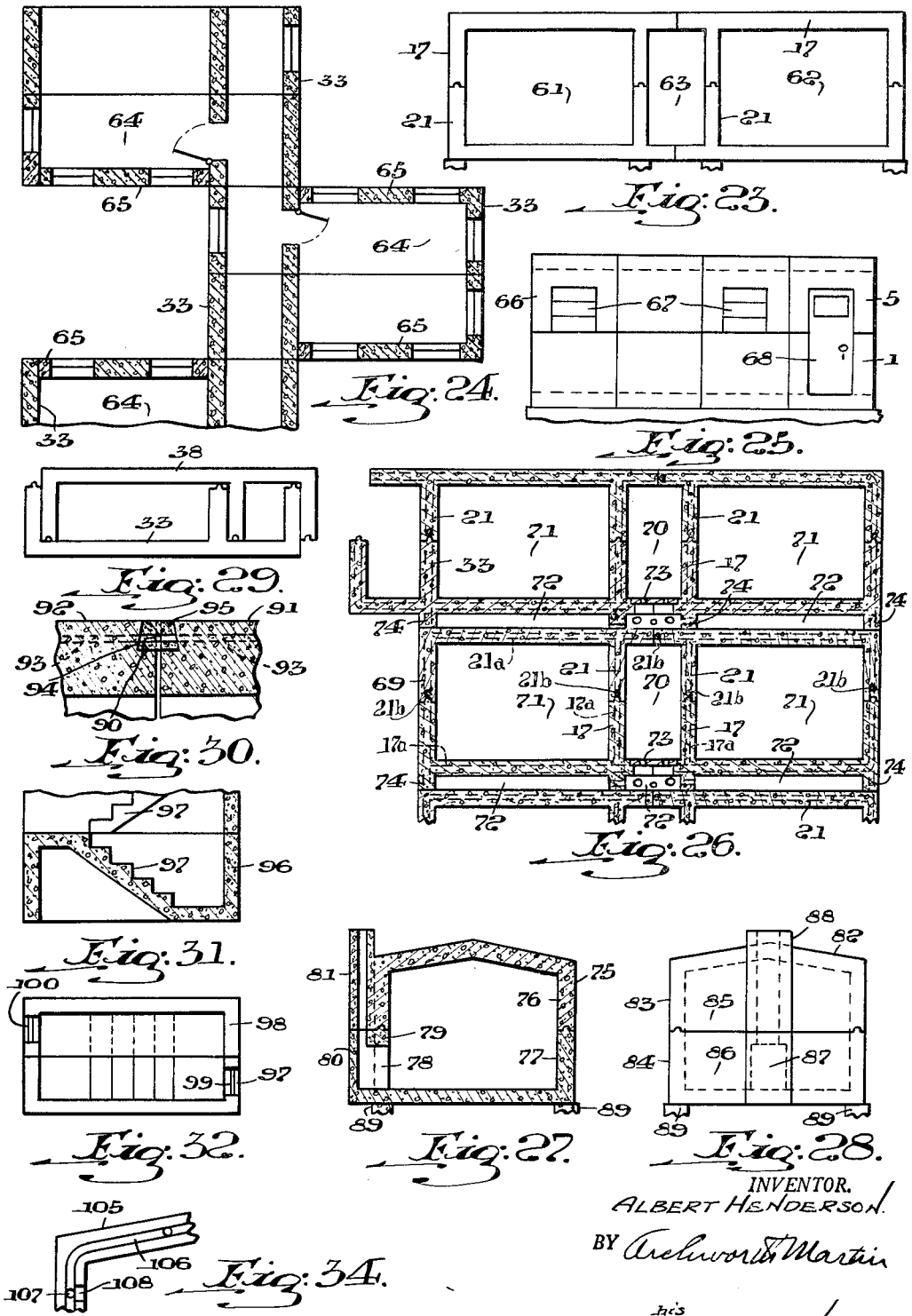

3,201,907
PRECAST SEGMENTAL BUILDING UNITS
Albert Henderson, 4014 5th Ave., Pittsburgh 13, Pa.
Filed Dec. 5, 1956, Ser. No. 626,448
13 Claims. (Cl. 52—73)

This invention relates to the building art, and more particularly to the use of preformed units of standardized shapes, made in the form of segments precast from concrete or other moldable material, the segments each having sidewalls and a floor or roof, and being of standardized shapes that are assemblable to form buildings of various shapes and sizes.

One object of my invention is to provide precast segments of the character referred to, that while they comprise only three basic segments for the lower halves of rooms, and a series of upper half-segments to be superposed on the lower basic segments, the upper and lower segments being assemblable in a variety of combinations, to form complete buildings of various shapes and sizes, that are particularly suitable for houses, schools, etc.

Another object of my invention is to provide segments of such shapes that they can conveniently be cast in molds that are approximately of a given form but are readily alterable to produce the various shapes, the segments being nestable for convenience of shipping, from the factory where they are produced.

Still another object of my invention is to produce segments that have fireplaces and chimneys cast integrally therewith, thus avoiding the need for a foundation, and also to cast stairways integrally with the segment walls.

The invention is shown in the drawings as preferably embodying upper and lower segments each of one-half the height of a room, to facilitate nesting thereof for saving in shipping space and to reduce danger of damage were the lower side wall made nearly full room height, and having the further advantage of greater resistance to shear under tornado-like forces in the case of multi-story buildings. However, in buildings of lesser height, the lower section can extend for more than one-half the height of a room, particularly if the roof is of a shape which gives it much greater weight than the floor.

In the accompanying drawings,

FIGURES 1, 2, and 3 are elevation views of the three basic lower segments;

FIGS. 4, 5 and 6 are plan views of these three basic lower segments;

FIGS. 7, 8, 9, 10, 11, 12, 13, 14 and 15 are elevation views of some upper segments;

FIGS. 16, 17, 18, 19, 20, 21, 22 and 23 are elevation views of the segments asembled to form rooms;

FIG. 24 is a plan view of segments of the closed hallway type assembly in reverse arrangement to form a plurality of rooms with a common hallway;

FIG. 25 is a side elevational view of assembled upper and lower segments;

FIG. 26 is a cross section elevation through a multistory building showing assembled segments;

FIGS. 27 and 28 are a cross section in side elevation and an end elevational view, respectively, of fireplace and chimney segments;

FIG. 29 shows two segments as nested for storage or shipment;

FIG. 30 is a sectional view of the segments, showing reinforcing rod ties welded together;

FIGS. 31 and 32 are sectional and plan views, respectively, of stairway segments;

FIG. 33 is a cross-section elevation view of segments with continuous sash, and

FIG. 34 shows fragmentary elevational view of molded recesses at one end of the segments for electric wiring.

The following is a detailed description of the segments and their asemblies.

FIGS. 1 and 4 show one of my standard concrete segments 1 which has its floor member 2 integrally cast to spaced wall members 3. The walls have tongues 4 integrally cast thereto. FIG. 7 shows a flat roof or ceiling segment 5 which has a flat roof member 6 integrally cast to spaced wall members 7, the members 7 having grooves 8 formed thereon which match tongues 4 in the segment 1. FIG. 8 shows an inclined or pitched roof for a segment 9 which has its roof member 10 integrally cast to spaced wall members 11. Grooves 12 in the walls 11 will match tongues 4 in FIG. 1. FIG. 9 shows a gable roof style segment 13 which has a roof member 14 integrally cast to spaced walls 15, and grooves 16 that can match the tongues 4 in FIG. 1.

FIGS. 2 and 5 show a concrete hallway segment 17 that has a concrete floor member 18 integrally cast to spaced concrete walls 19. A concrete hallway member 20 is integrally cast to the segment 17. FIG. 10 shows a hallway with a flat roof or ceiling on a concrete segment 21. The roof or ceiling 22 is integrally cast to spaced concrete wall members 23. The hallway roof or ceiling segment 24 is integrally cast to the segment 21.

FIG. 11 shows a roofed hallway segment 25 which has sloped roof member 26 integrally cast to spaced walls 27. The roof 28 is flat to accommodate reversed segments as shown in FIGS. 23 and 24, and is integrally cast to the segment.

FIG. 12 shows an inclinded or pitched concrete roof segment 29 which has its roof member 30 integrally cast to spaced walls 31. A hallway roof 32 is also flat and is integrally cast to the segment 29.

FIGS. 3 and 6 show a lower segment 33 for a closed hallway which has a floor member 34 integrally cast to spaced walls 35. A floor member 36 is integrally cast to the segment 33, and a hallway wall member 37 is integrally cast to the floor member 36.

FIG. 13 shows a closed hallway segment 38 which has a flat roof or ceiling member 39 integrally cast to spaced wall members 40. A hallway roof or ceiling member 41 is integrally cast to the segment 38 and a hallway wall member 42 is integrally cast to the hallway roof or ceiling 41.

FIG. 14 is reversed inclined roof concrete segment 43 which has concrete roof member 44 integrally cast to spaced concrete wall members 45, concrete hallway roof member 46 is integrally cast to segment 43. Hallway wall member 47 is integrally cast to hallway roof member 46.

FIG. 15 shows a segment 48 having an inclined roof member 49 integrally cast to wall members 50, the hallway roof member 51 being cast to segment 48 and hallway wall 52 being integrally cast to a roof member 51.

FIG. 16 shows a room 53 made up of a segment 1 and an upper segment 13. The segments rest on foundations 54. FIG. 17 shows a room 55 made up of segments 17 and 21. FIG. 18 shows a room 56 having segments 33 and 43. FIG. 19 shows a room 57 made up of segments 17 and 5. FIG. 20 shows room 58 made up of segments 33 and 25. This may be a covered outside hallway or porch assembly.

FIG. 21 shows a room 59 made up of segments 33 and 13. This assembly may be for an uncovered porch. FIG. 22 shows a room 60 with segments 1 and 21. This assembly would provide a canopy or overhang. FIG. 23 shows rooms 61 and 62 made up of hallway segments 17 and 21 to provide a hallway 63.

FIG. 24 shows closed hallway segments assembled in reverse to provide rooms 64 with windows or three sides, the hallway portions of the segments coinciding to form a straight hallway. Walls 65 can also be made of concrete, either precast separately or they can be integrally cast to the segments.

FIG. 25 shows building 66 made up of segments 1 and 5 with windows 67 formed in the side walls of the segments 5. The placing of the windows generally in the upper segments simplifies the manufacture of the segments. The window frames can rest on the tongues of the segments 1, the tongues acting as sills. A door 68 is also shown, the upper and lower segments being molded to suit the door opening.

FIG. 26 shows a multi-story building 69 made up of segments 17 and 21 to form hallways 70 and rooms 71. Segment 33 can be incorporated in the building to supply a balcony, and segment 21 provides a canopy for the balcony. The floors of the rooms have spaces 72 between them and the ceilings of the rooms below. This air space could be a convenient duct for heating or cooling or for metal pipes for wiring, water, gas, etc. The hallways have hand holes 73 to get at piping in the ducts 72. The lower segments are provided with ribs 74 that are preferably integrally cast thereto. All vertical and horizontal joints have metal ties such as metal members 17a and 21a embedded in the concrete and welded together as at 21b.

FIG. 27 shows a fireplace and chimney assembly 75. In its upper segment 76 and lower segment 77, a fireplace 78 is molded in wall member 79 and a chimney member 80 in the segment 77. All are cast integrally, and a chimney member 81 is integrally cast to the segment 76.

FIG. 28 shows a building 82 with upper segment 83 and lower segment 84. Upper segment 83 has end wall 85 integrally cast to it, or it may be cast separately and installed in the segment. Lower segment 84 has end wall 86 integrally cast to it, or it may be cast separately. A fireplace 87 and the lower part of the chimney 88 are molded in the end wall 86. The upper part of the chimney 88 is integrally cast to the segment end wall 85. A part of the end walls 85 and 86 can form a wall of the chimney 88. The concrete chimney and fireplace segment 75 can be installed between other segments where desired. No separate foundations are required for the chimneys, which is always the case in typical construction. The spaced foundations 89 carry the segments and the segments carry the chimneys and fireplaces. The chimneys cantilever out away from the walls of the segments. In some cases, I may integrally cast the chimneys against the inside face of the walls of the segments and have the chimneys extend through the roof members.

FIG. 29 shows closed hallway segments 33 and 38 nested together in storage or for shipment. Having the wall members half the height of the rooms makes possible their nesting in the least amount of space. The space saving applies to all of the segments.

FIG. 30 shows a welded connection 90 at the joints of segments 91 and 92. Steel rods 93 embedded in the various members of the segments have their ends exposed in pockets 94 and after the rod ends are welded, the pockets are filled with mortar 95. The joints between the upper and lower segments may be welded and the horizontal joints along the hallways are also welded. In multi-story buildings, the lower room segments are bolted or welded to the upper segments of the room below.

FIGS. 31 and 32 show a stairway 96 with step segments 97. A segment 98 encloses the stairway. This makes it possible to provide precast reinforced concrete stairways of half room height which will accommodate buildings of many stories. Only four segments will be required for each floor, for a multi-story building, two step segments such as 97 and two enclosure segments such as 98. A door 99 or window 100 can be molded in the segment walls where required.

FIG. 33 shows a room 101 that has upper segments 102 and lower segments 1. The upper segments are supported by posts 103 which are secured to the segments. This provides a continuous window space between the upper and lower segments. A continuous sash 104 is shown in this space. It rests on the tongues of the lower segments and is secured in the grooves in the upper segments. I may omit these posts and provide metal posts embedded in the concrete walls of the lower segments or on the concrete walls of the upper segments.

FIG. 34 shows any of the segments 105 with a half-round recess 106 molded at an end of each segment. This recess extends along the full length of the wall, floor, roof or ceiling and hallway members. The recesses communicate with ducts such as 107 which extend lengthwise entirely through the segments and communicate with a recess at the end of the next abutting segment. Hand holes, switch and outlet boxes such as 108 can be molded in the inside walls, in the floor and ceiling of the segments where desired.

The segments may have integrally cast end walls and partitions, or the end walls and partitions may be cast separately and installed in the segments.

The making of the segments comprising the floor, roof or ceiling and hallway members in one concrete casting as shown in my Patent No. 2,691,291, issued October 12, 1954, and in my pending patent application Serial No. 460,817, filed October 17, 1954, and now abandoned, requires that many of the larger building segments be cast on the job, and too much room is taken up in storage space. Making the room segments in upper and lower parts means that all of the segments can be made in local concrete pipe plants. The segments can therefore be stocked in less space and sold as a commodity in each community, as are concrete blocks or concrete pipe. Less inventories have to be kept, because the upper segments of different roof types can fit the lower standard room and hallway segments.

A purchaser merely selects the type of roof he wants for his building. Another reason for making the height of the walls half the room height is the fact that the walls are cantilevers and if one wall was higher than the other spaced wall, the longer wall would have less shear strength than the short one.

I claim as my invention:

1. A building that comprises portable preformed lower segments and preformed upper segments, each lower segment having a floor member integrally formed to spaced vertical wall members, each upper segment having a ceiling member integrally formed to spaced vertical wall members, the vertical wall members in said upper segments being mainly flat on their lower edges and resting on the upper edges of the lower vertical wall members which are mainly flat, thus forming horizontal joints, and means connecting the upper and lower wall members against relative sidewise displacement at said joints.

2. A building as defined by claim 1, wherein each floor member extends outwardly from a side of one of their vertical wall members a sufficient distance to serve as a walkway or a porch.

3. A building as defined by claim 1, wherein the said ceiling member extends outwardly from a side of one of its vertical wall members a sufficient distance to serve as a canopy or a blacony.

4. A building as defined by claim 1, wherein each floor member extends outwardly from a side of one of its vertical wall members a sufficient distance to serve as a walkway, and each ceiling member extends outwardly from a side of one of their vertical wall members a sufficient distance to serve as a canopy or a balcony.

5. A building that comprises portable preformed lower segments and preformed upper segments, each lower segment having a floor member integrally formed to several spaced vertical wall members, the floor member being extended beyond a vertical wall member, to serve as a walkway, and each upper segment having a ceiling member integrally formed to a pair of spaced vertical wall members, the vertical wall members in said upper segments resting on two of the vertical wall members in said lower segments.

6. A building that comprises portable preformed lower segments and preformed upper segments, each lower segment having a floor member integrally formed to several spaced vertical wall members, each upper segment having a ceiling member integrally formed to a pair of spaced vertical wall members, said ceiling member extending a substantial distance outwardly from a side of one of its wall members to serve as a canopy, and the vertical wall members in said upper segments resting on two of the vertical wall members in said lower segments.

7. A building as defined by claim 6, wherein the said floor members that extend between two of said several vertical wall members in said lower segment serve as a walkway or a porch.

8. A building having vertically spaced rooms each room being made from upper and lower portable preformed segments, each lower segment having a floor member integrally formed to spaced vertical wall members and each upper segment having a ceiling member integrally formed to spaced vertical wall members, the vertical wall members in said upper segments resting on the vertical wall members of said lower segments, and spaced short-height other vertical walls integrally formed to certain of said room segments, in position to separate upper and lower rooms.

9. A building that comprises portable preformed lower and upper segments, each lower segment having a floor member integrally formed to spaced vertical wall members, each upper segment having a roof member integral with spaced vertical wall members, said vertical wall members in said upper segments being spaced inwardly from both edges of their roof members, and the said vertical wall members in said upper segments resting on the vertical wall members of said lower segments.

10. A precast reinforced concrete building unit having floor and ceiling members integrally formed to spaced vertical wall members, reinforcing imbedded in the concrete of said vertical wall members, said unit comprising a separately-formed lower portion having a floor member integrally formed to spaced vertical wall members and a separately formed upper portion having a ceiling member integrally formed to spaced vertical wall members, the wall members of said upper portion resting on the wall members of said lower portion and forming joints therebetween, and the reinforcing in said vertical wall members being rigidly secured together across the joints.

11. A preformed portable reinforced concrete building unit for a room, the said unit comprising a floor or roof member integrally formed to spaced vertical wall members the distance between wall members being substantially equal to the width of the room and the height of the wall members being substantially equal to half the height of the room, the length of the wall members being equal to the length of the floor or roof members and of partial room length, whereby said unit may be assembled with its walls in superposed relation to the walls of a similarly formed unit an in end-to-end relation to other similarly formed units, to form a room of full height and length.

12. A unit as defined in claim 11, the floor or roof member is extended outwardly a substantial distance beyond one of the wall members.

13. A unit as recited in claim 12, wherein a third vertical wall is formed integrally with the outer end of the said extended member.

References Cited by the Examiner

UNITED STATES PATENTS

| | | | |
|---|---|---|---|
| 1,418,510 | 6/22 | Alexander | 20—1 |
| 2,691,291 | 10/54 | Henderson | 50—140 |

FOREIGN PATENTS

| | | |
|---|---|---|
| 626,692 | 1949 | Great Britain. |
| 992,188 | 1951 | France. |

OTHER REFERENCES

"The Architectural Forum," page 47, July 1942.

EARL J. WITMER, *Primary Examiner.*

WILLIAM I. MUSHAKE, CORNELIUS D. ANGEL, *Examiners.*